United States Patent [19]

Ostaszewski

[11] Patent Number: 5,283,682
[45] Date of Patent: Feb. 1, 1994

[54] REACTIONLESS SCANNING AND POSITIONING SYSTEM

[75] Inventor: Miroslaw A. Ostaszewski, Boulder, Colo.

[73] Assignee: Ball Corporation, Muncie, Ind.

[21] Appl. No.: 957,420

[22] Filed: Oct. 6, 1992

[51] Int. Cl.⁵ ............................................. G02B 26/08
[52] U.S. Cl. ..................... 359/198; 359/214; 359/221; 310/22; 310/36
[58] Field of Search ............... 359/196, 198, 199, 213, 359/214, 221, 223, 224; 310/12, 15, 22, 23, 24, 36, 326

[56] References Cited

U.S. PATENT DOCUMENTS

| | | | |
|---|---|---|---|
| 3,234,844 | 2/1966 | Fain et al. | 359/214 |
| 3,453,464 | 7/1969 | Baker, Jr. | 310/36 |
| 3,532,408 | 10/1970 | Dostal | 359/214 |
| 3,612,643 | 10/1971 | Weber | 359/221 |
| 3,952,217 | 4/1976 | Rawlings | 310/36 |
| 4,160,177 | 7/1979 | Ascoli | 310/22 |
| 4,302,709 | 11/1981 | Tichtinsky | 359/214 |
| 4,439,003 | 3/1984 | Roth | 359/221 |
| 4,613,203 | 9/1986 | Proetel et al. | 359/214 |
| 4,619,498 | 10/1986 | Croiset | 359/214 |
| 4,802,720 | 2/1989 | Paulsen | 359/214 |
| 4,861,125 | 8/1989 | Vaught | 359/214 |
| 4,902,083 | 2/1990 | Wells | 359/221 |
| 5,009,473 | 4/1991 | Hunter et al. | 359/223 |
| 5,066,084 | 11/1991 | Culp | 359/213 |
| 5,097,356 | 3/1992 | Paulsen | 359/214 |

Primary Examiner—Loha Ben
Attorney, Agent, or Firm—Gilbert E. Alberding

[57] ABSTRACT

A reactionless scanning and positioning system is disclosed which includes a mirror scanning assembly coupled to a reaction mass having a rotational moment of inertia equal and opposite to that of the mirror assembly, so that the system is effectively reactionless. The overall mechanical design of the scanning system is optimized to require minimum power consumption by the actuators used to drive the scanning assembly. The scanning assembly is mounted on flexible pivots having a torsional stiffness which provides a mechanically resonant frequency such that a minimum amount of power is required to angularly position the mirror. A position encoder disc is used in both coarse positioning mode and in a relatively fast scanning mode to determine the position of the mirror. In the present invention, the position of the mirror is accurately determinable in a fast scanning mode due to the novel mounting of the mirror with respect to the position encoder disc.

23 Claims, 7 Drawing Sheets

1

REACTIONLESS SCANNING AND POSITIONING SYSTEM

FIELD OF THE INVENTION

This invention relates generally to scanning systems and, more specifically, to a thermal infrared radiometer scanning system comprising a movable mirror, a reaction mass, and an associated mirror position sensing system.

RELATED APPLICATIONS

The subject matter of the invention described herein is related to co-pending U.S. patent application by Ostaszewski, "Reactionless Scan Mechanism", Ser. No. 07/894,889, filed Jun. 8, 1992.

PROBLEM

Scanning systems typically use a mirror, lens, or detector, or the like, to scan a target area.

Weber, U.S. Pat. No. 3,612,643, issued Oct. 12, 1971, describes a scan mechanism in which a mirror, rotatably positioned on bearings, is driven by a rotary motor and a belt.

Dostal, U.S. Pat. No. 3,532,408, issued Oct. 6, 1970, teaches a scanning device in which a mirror is mounted on a torsionally deflectable member, and wherein pole pieces are attached to opposite sides of the mirror, and field coils are attached to a frame of the device.

It is a problem in the field of scanning technology to provide a scanning system having both high scanning accuracy and a rapid scan rate for scanning a target area. It is a further problem to minimize the power consumption of such a scanning system when it is used on a power-limited platform such as a spacecraft. Minimization of power used to drive the scanning system increases the difficulty of maintaining a fast scan rate for long periods of time. It is an additional problem to minimize the weight of the scanning system in order to reduce the overall weight of the spacecraft. Furthermore, in order to avoid perturbating the spacecraft containing the scanning system, any scanning motion made by the mirror (or lens or detector) must be compensated for. In addition, in conventional scanning systems, it is difficult to accurately determine the position of the mirror when the mirror is scanning at a fast rate.

SOLUTION

The above problems are solved and a technical advance is achieved in the field by the reactionless scanning and positioning system of the present invention. The system of the present invention includes a mirror scanning assembly (including a mirror support) coupled to a reaction mass having a rotational moment of inertia equal and opposite to that of the mirror assembly, so that the system is effectively reactionless. The spacecraft containing the scanning system is thus not caused to shake or required to compensate for disturbances generated during a scanning operation.

The overall mechanical design of the scanning system is optimized to require minimum power consumption by the actuators used to drive the scanning assembly. This minimum power consumption is effected by having the mirror assembly mounted on flexible pivots. The torsional stiffness of these flexible pivots is chosen to provide a mechanically resonant frequency such that a minimum amount of power is required to angularly position the mirror. Stored spring-effect energy in the flexible pivots is used to help return the mirror in a scanning direction opposite to the direction in which the mirror is initially moved by the mirror scanning actuators. Because of the system mechanical resonance, movement of the mirror in this opposite direction is thus accomplished by supplying a minimal amount of power to the mirror scanning actuators.

In the present scanning system there are two modes for positioning the mirror—a coarse positioning mode wherein the mirror is moved slowly over an arc of 200 degrees or more, and a relatively fast scanning mode wherein the mirror is moved rapidly back and forth over an arc of approximately ±2.5 degrees. A position encoder disc is used in both modes to determine the position of the mirror.

It is relatively simple to determine the mirror position in a coarse scanning mode wherein the mirror is being moved slowly. However, in the relatively fast scanning mode, it is more difficult to determine the position of the mirror using conventional position measurement systems. In the present invention, the position of the mirror is accurately determinable in a fast scanning mode due to the novel mounting of the mirror with respect to the mirror position sensing system. In the present invention, the flexible pivots used to support the mirror impart an eccentric motion to the axis of rotation of the mirror. This eccentric motion causes "wobbling" of the mirror. The present invention employs a mounting arrangement of the position encoder disc on its own flexible pivots as well as a unique connection between the position encoder disc and the mirror which collectively function to decouple the effect of the eccentric motion of the mirror rotational axis. This decoupling provides for an extremely accurate measurement of the mirror position.

In addition, the mirror scanning operation is accomplished by using actuator motor cores which are not attached to any moving part of the mirror assembly in order to reduce the rotational inertia of the mirror assembly. This reduction of inertia allows the scanning system to scan at a faster rate.

DETAILED DESCRIPTION

Figure 1:
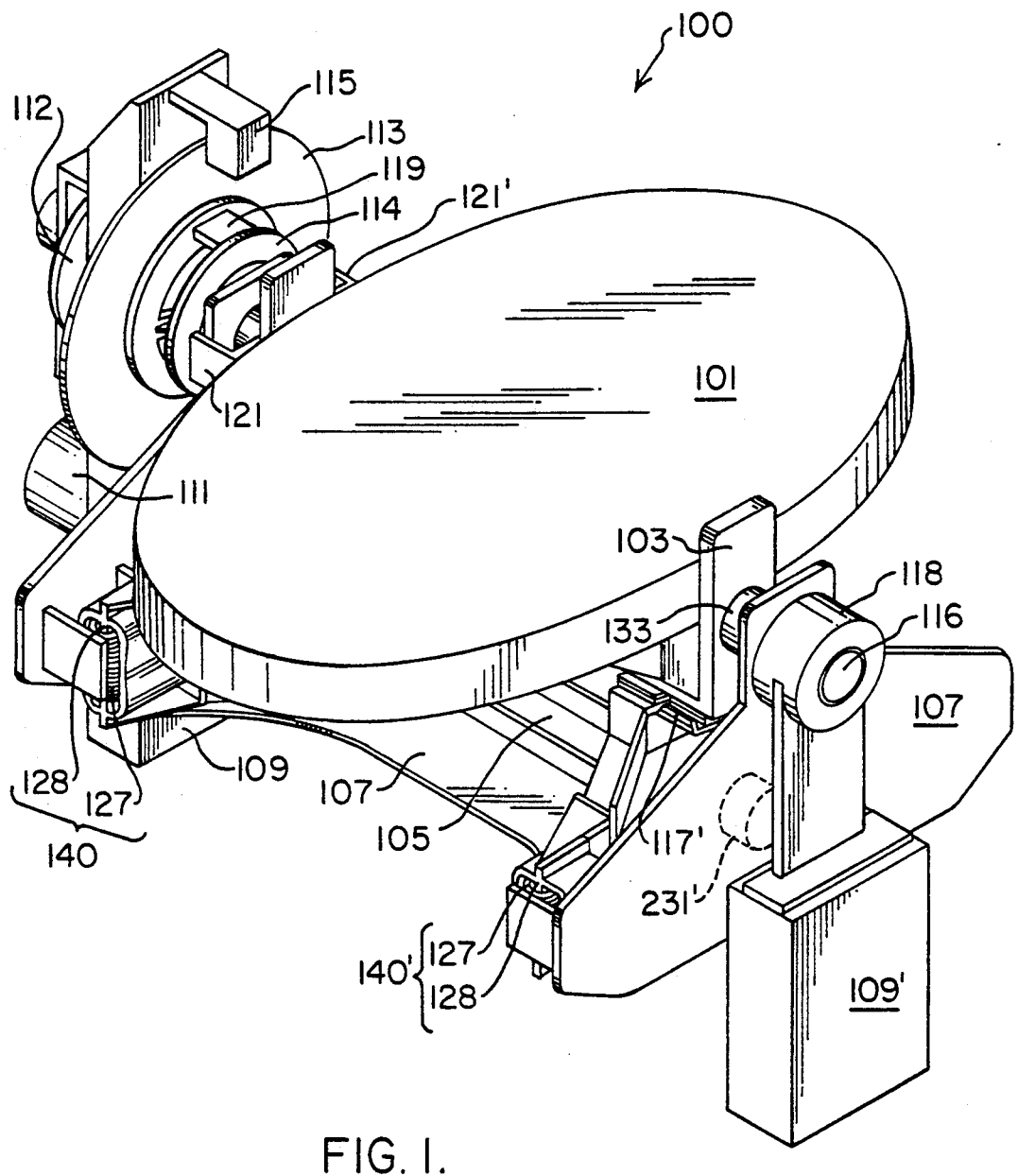
FIG. 1 is a perspective view of the resonant optical scanning and position sensing system.
Figure 2:
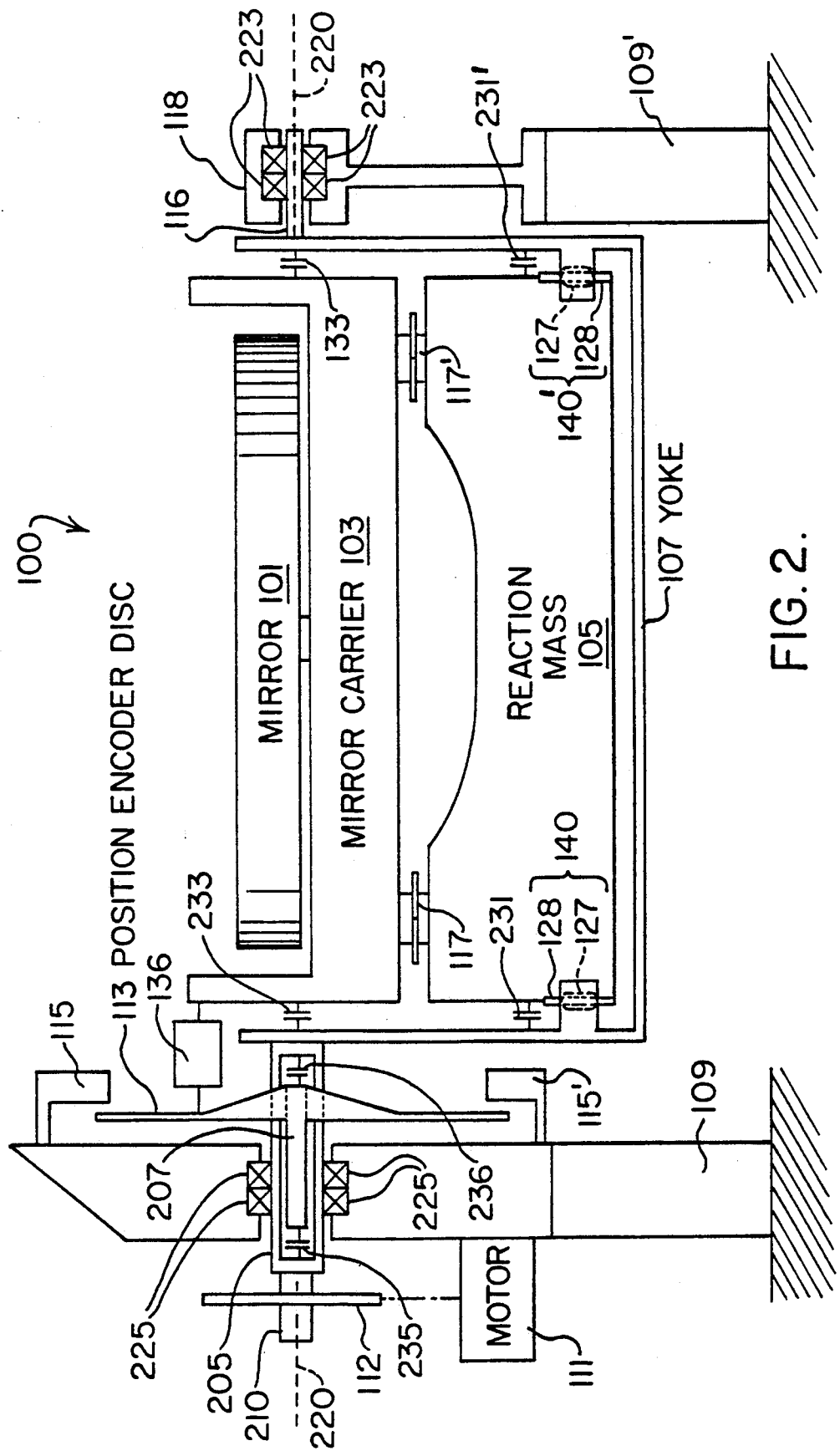
FIG. 2 is a diagrammatic view showing operative components of the scanning system.

FIG. 1 is a perspective view showing operative components of the reactionless scanning and positioning system 100 (hereinafter referred to as "scanning system" 100). FIG. 2 is a diagrammatic view of scanning system 100. The operation of scanning system 100 can be best understood by concurrent reference to both FIGS. 1 and 2. Scanning system 100 is essentially a "three-mass system" wherein the three main components are (1) a mirror/mirror carrier assembly 101/103, (2) a reaction mass 105, and (3) a yoke 107.

Yoke 107 is coupled by a pair of flexible pivots 133, 233 to mirror/mirror carrier assembly 101/103. A yoke drive motor 111 attached to a fixed support 109 is used for coarse positioning of the yoke/mirror/mirror carrier assembly 107/101/103 about axis 220. Yoke drive motor 111 is connected via a gear 112 to drive shaft 210, which is, in turn, fixedly connected to outer shaft 205. Outer shaft 205 is fixedly connected to yoke 107. An inner shaft (spindle) 207 is located within outer shaft 205. In performing a coarse positioning operation, rotation of gear 112 by yoke drive motor 111 causes rotation of yoke 107 and a corresponding rotation of mirror/mirror carrier assembly 101/103 about axis 220. The coarse positioning adjustment is independent of the scanning function and is used to rotate mirror/mirror carrier assembly 101/103 over a relatively large arc (200 degrees or more) for target location and for calibration purposes.

Yoke 107 is also coupled to reaction mass 105 by a pair of flexible pivots 231, 231'. In performing a scanning operation, two pairs of actuators 140 (only one pair of which is visible in FIGS. 1 and 2) cause reaction mass 105 to oscillate about flexible pivots 231, 231' over a small angular excursion. This oscillation of reaction mass 105 causes an opposite oscillation of mirror carrier 103 which is attached via a pair of drive flexures 117, 117' to reaction mass 105. Drive flexures 117, 117' function to cause the oscillation of mirror carrier 103 about flexible pivots 133, 233 in an angular direction opposite to that of reaction mass 105.

Reaction mass 105 has a rotational moment of inertia equal and opposite to that of the mirror/mirror carrier assembly 101/103, so that the system 101/103/105 is effectively reactionless when performing a scanning operation.

In order to determine the position of mirror 101, a position encoder disc 113 is located between yoke 107 and support 109. Position encoder disc 113 rotates essentially in accordance with drive shaft 210, as well as with mirror/mirror carrier assembly 101/103. A pair of encoder read heads 115, 115' are fixedly attached to support 109 and are located proximate position encoder disc 113 in order to determine the mirror rotational position with respect to support 109. A novel coupling method is employed between position encoder disc 113 and mirror carrier 103, as well as between position encoder disc 113 and drive shaft 210. Position encoder disc 113 is rigidly connected to inner shaft (spindle) 207 which rotates via flexible pivots 235, 236 located at opposite ends of inner shaft 207. These flexible pivots 235, 236 connect inner shaft 207 to outer shaft 205, which in turn is connected to yoke 107. This coupling method allows closer tracking of position encoder disc 11 with mirror rotational position by providing decoupling between position encoder disc 113 and the eccentric movement imparted to mirror carrier 103 by flexible pivots 133, 133' as mirror carrier is rotatably moved.

MIRROR POSITIONING

As shown in FIGS. 1 and 2, yoke 107 is rotatably attached to a fixed support 109, 109'. The entire mirror/mirror carrier and reaction mass assembly 101/103/105 (which is movably connected to yoke 107) is also movably coupled to support 109, 109' via a right yoke support bearing pair 225 and a left yoke support bearing pair 223. Right yoke support shaft 116 rotates on bearing pair 223 which is enclosed by bushing 118. Mirror/mirror carrier 101/103 and reaction mass 105 are movably coupled to yoke 107 so that they move together as yoke 107 is rotated by yoke drive motor 111. Yoke drive motor 111 attached to support 109 is used for coarse positioning of the yoke 107 over an arc of at least 200 degrees.

Figure 7:
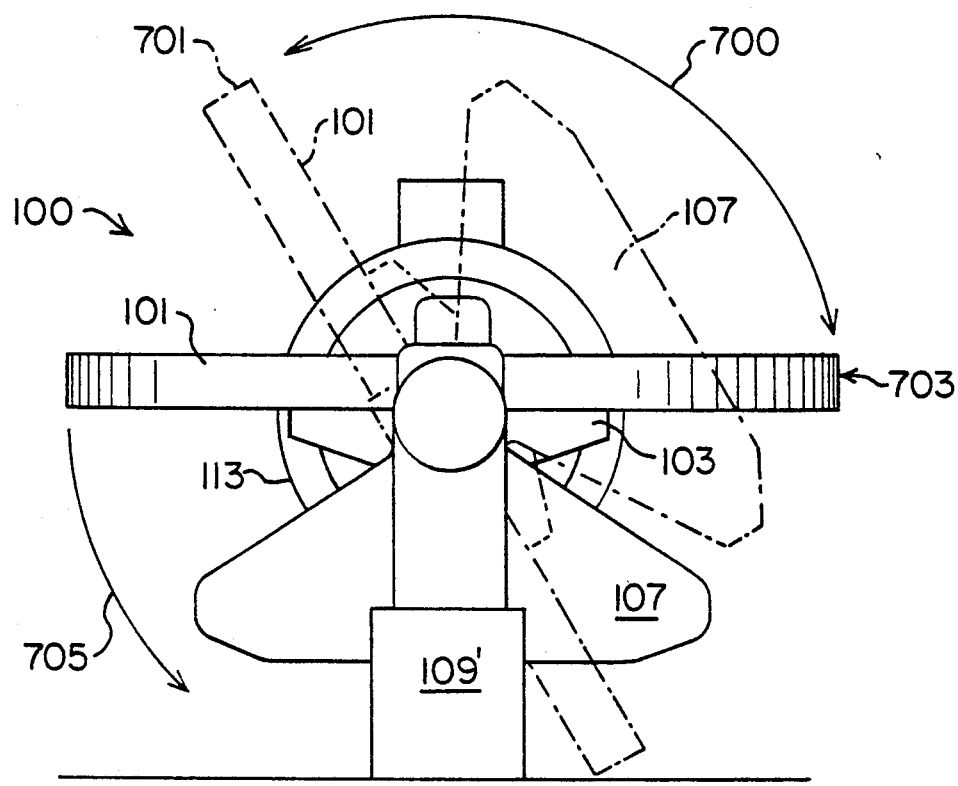
FIG. 7 illustrates the coarse positioning movement of the mirror and yoke with respect to the scanning system support structure.

FIG. 7 illustrates the coarse positioning of mirror 101 and yoke 107 with respect to scanning system 100 support 109' (and support 109, which is not shown on FIG. 7). FIG. 7 illustrates the movement of scanning system 100 yoke 107 and mirror 101 over a substantial angular displacement 700 between positions 701 and 703. Yoke 107 and mirror 101 are also capable of movement in direction 705.

Coarse positioning of mirror 101 is performed in order to accomplish at least two functions. One of these functions is to move the mirror 101 to a desired position so that a mirror scanning operation can be performed. Another function of coarse positioning of mirror 101 is to move the mirror 101 to a position in front of a calibration source (not shown) so that a thermal infrared radiometer or other device (not shown) can be calibrated.

RESONANT SCANNING

As best seen from FIG. 2, the overall mechanical design of scanning system 100 is optimized to require minimum power consumption by the actuators 140 used to drive the reaction mass/mirror carrier/mirror assembly 105/101/103. This minimum power consumption is effected by flexibly coupling mirror/mirror carrier assembly 101/103 and reaction mass 105 to yoke 107. Mirror/mirror carrier assembly 101/103 is coupled to yoke 107 via a pair of flexible pivots 133 and 233. Reaction mass 105 is coupled to yoke 107 via another pair of flexible pivots 231 and 231'.

Figure 6:
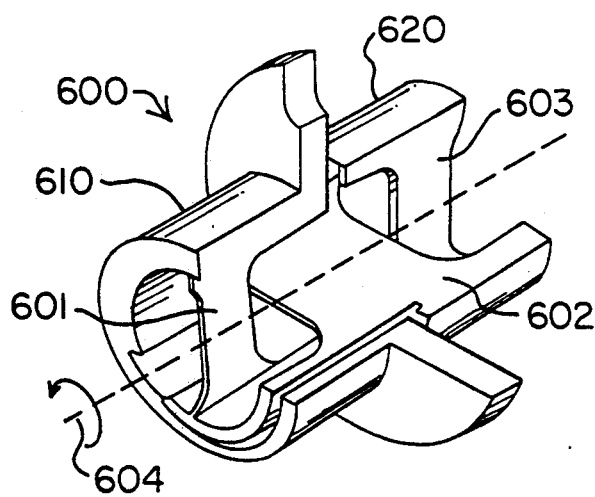
FIG. 6 is a cut-away view of a typical flexible pivot.

A typical flexible pivot 600 is shown in FIG. 6. Flexible pivots such as 600 allow two rotatable members (not shown) to be coupled at ends 610, 620 with a torsional resistance between the two rotatable members about axis 604. This torsional resistance is imparted by spring members 601, 602, 603. The flexible pivot 600 provides a frictionless coupling between the rotatable members.

The torsional stiffness of flexible pivots 133 and 233 shown on FIGS. 1 and 2 is chosen to provide a mechanically resonant frequency of the moving mass of the scanning system 100 at the desired scanning frequency such that the amount of power necessary to generate the desired resonant scanning is minimized. Spring-effect energy stored in flexible pivots 133 and 233 is used to movably return mirror 101 during scanning in a direction opposite to the direction in which the mirror 105 is moved by actuators 140. In this manner, power necessary to control mirror 101 is minimized.

REACTIONLESS SCANNING OPERATION

As shown in FIGS. 1 and 2, reaction mass 105 is coupled to mirror carrier 103 via a pair of drive flexures 117, 117'. Two pairs of actuators 140 are coupled to reaction mass 105. One pair is located on the front of reaction mass 105 as shown in FIG. 1. The second pair is analogously located on the back of reaction mass 105 and is not shown.

Figure 8:
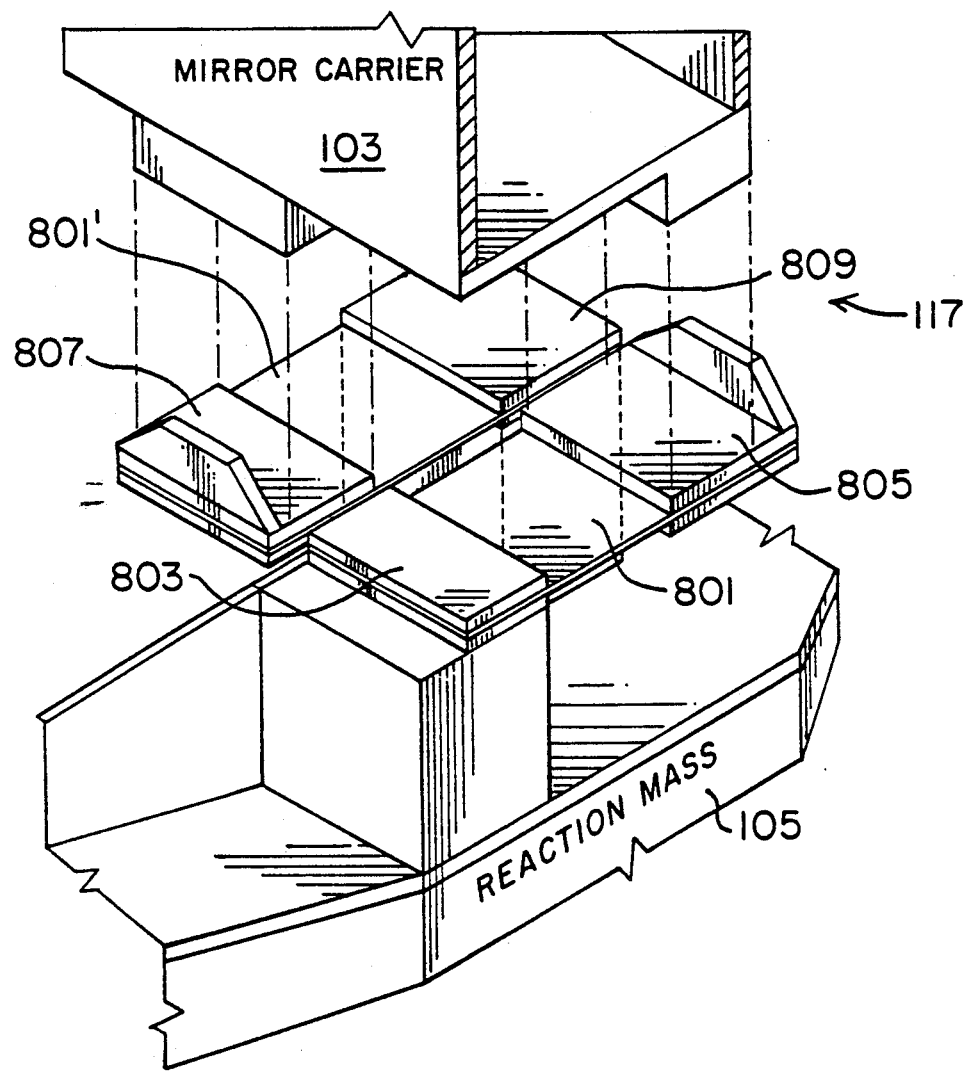
FIG. 8 illustrates one set of two drive flexures used to couple the reaction mass to the mirror carrier.
Figure 9:
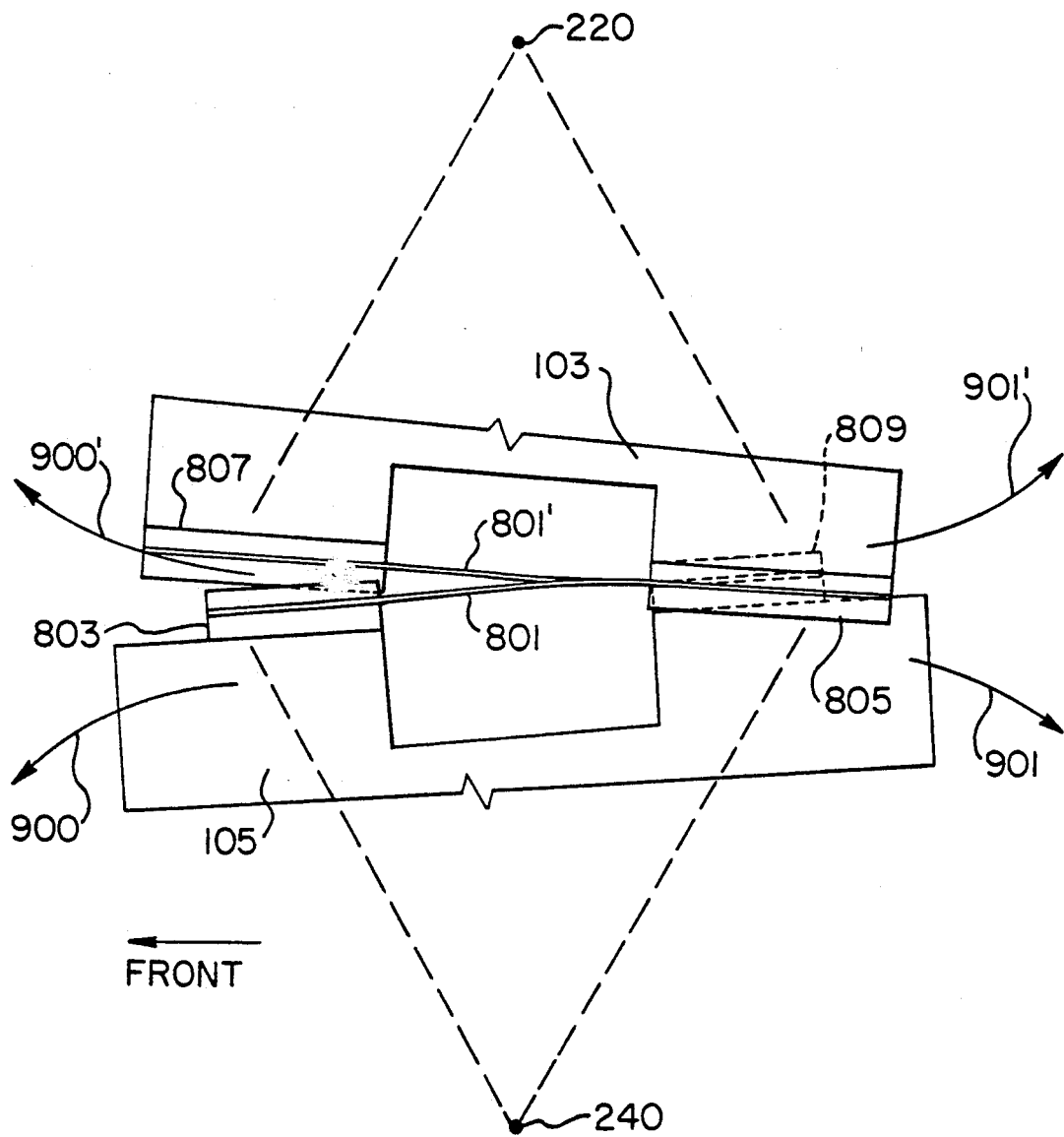
FIG. 9 illustrates the relative movement between the reaction mass and the mirror carrier as a result of the operation of the drive flexures.

FIG. 8 illustrates one (117) of the two drive flexure pairs used to couple reaction mass 105 to mirror carrier 103. FIG. 9 illustrates the relative movement between reaction mass 105 and mirror carrier 103 as a result of the operation of each drive flexure 117 and 117'.

As shown in FIG. 8, drive flexure 117 comprises two separate members, each of which includes a flat spring 801, 801'. Plate 803 is used to attach flat spring 801 to reaction mass 105. Plate 805 is used to attach flat spring 801 to mirror carrier 103. Plate 807 is used to attach flat spring 801' to mirror carrier 103. Plate 809 is used to attach flat spring 801' to reaction mass 105.

As shown in FIGS. 8 and 9, when the front end of reaction mass 105 is rotated in a counter-clockwise direction 900 about axis 240, the following actions take place:
 (1) Plate 803 (which is attached to reaction mass 105) and the front end of reaction mass 105 are displaced in direction 900;
 (2) Flat spring 801, which is attached to plate 803, exerts a pulling force on plate 805, causing attached mirror carrier 103 to rotate clockwise in direction 900' about axis 220.

When the front end of reaction mass 105 is rotated in a clockwise direction, the following actions take place:
 (1) Plate 809 (which is attached to reaction mass 105) is displaced in a clockwise direction 901 about axis 240;
 (2) Flat spring 801', which is attached to plate 809, exerts a pulling force on plate 807, causing attached mirror carrier 103 to move in a counter-clockwise direction 901' about axis 220.

Thus, when reaction mass 105 is moved in a given direction, mirror carrier 103 is displaced in a direction rotationally opposite to that of the reaction mass 105. Drive flexure 117' operates in a manner analogous to drive flexure 117 as described above.

Figure 10:
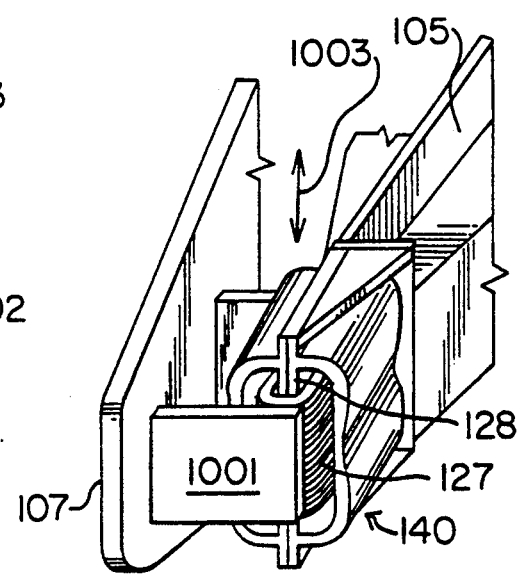
FIG. 10 illustrates the coupling of a typical linear actuator to the reaction mass and the yoke.

FIG. 10 illustrates the coupling of a typical linear actuator to reaction mass 105 and yoke 107. Each of these actuators 140 comprises an actuator motor coil 127 and an actuator motor core 128. The motor coil 127 of each actuator 140 is directly attached to yoke 107 by a coupling plate 1001. The motor core 128 of each actuator 140 is attached to reaction mass 105. In operation, each actuator 140 is energized to cause its motor core 128 to move either up or down in direction 1003. Movement in direction 1003 by actuator motor core 128 causes a corresponding movement of reaction mass 105. Each actuator 140 is a linear-type actuator which is well-known in the art. A typical similar actuator is manufactured by Ball Aerospace Corp., Post Office Box 1062, Boulder, Colo. 80306. Because the actuator motor coils 127 are not attached to reaction mass 105, the rotational inertia of the reaction mass/mirror/mirror carrier assembly 105/101/103 is reduced. This reduction of inertia allows scanning system 100 to scan at a faster rate.

Only the front pair of actuators, specifically left and right actuators 140 and 140' are shown in FIG. 1. An identical pair of actuators are similarly positioned in an analogous position at the rear of reaction mass 105. Actuators 140 and 140' are used to impart an oscillatory motion to reaction mass 105. This oscillatory motion of reaction mass 105 causes mirror/mirror carrier 101/103 to oscillate and thereby scan a target object. The angular excursion of the mirror about axis 220 during a typical scanning operation is a total of approximately 5 degrees.

Mirror/mirror carrier assembly 101/103 is coupled to reaction mass 105 by a pair of drive flexures 117, 117'. Reaction mass 105 has a rotational moment of inertia equal and opposite to that of the mirror/mirror carrier assembly 101/103, so that the system 101/103/105 is effectively reactionless. The spacecraft containing the scanning system 10 is thus not caused to shake or required to compensate for disturbances generated during a scanning operation.

POSITION SENSING

Figure 3:
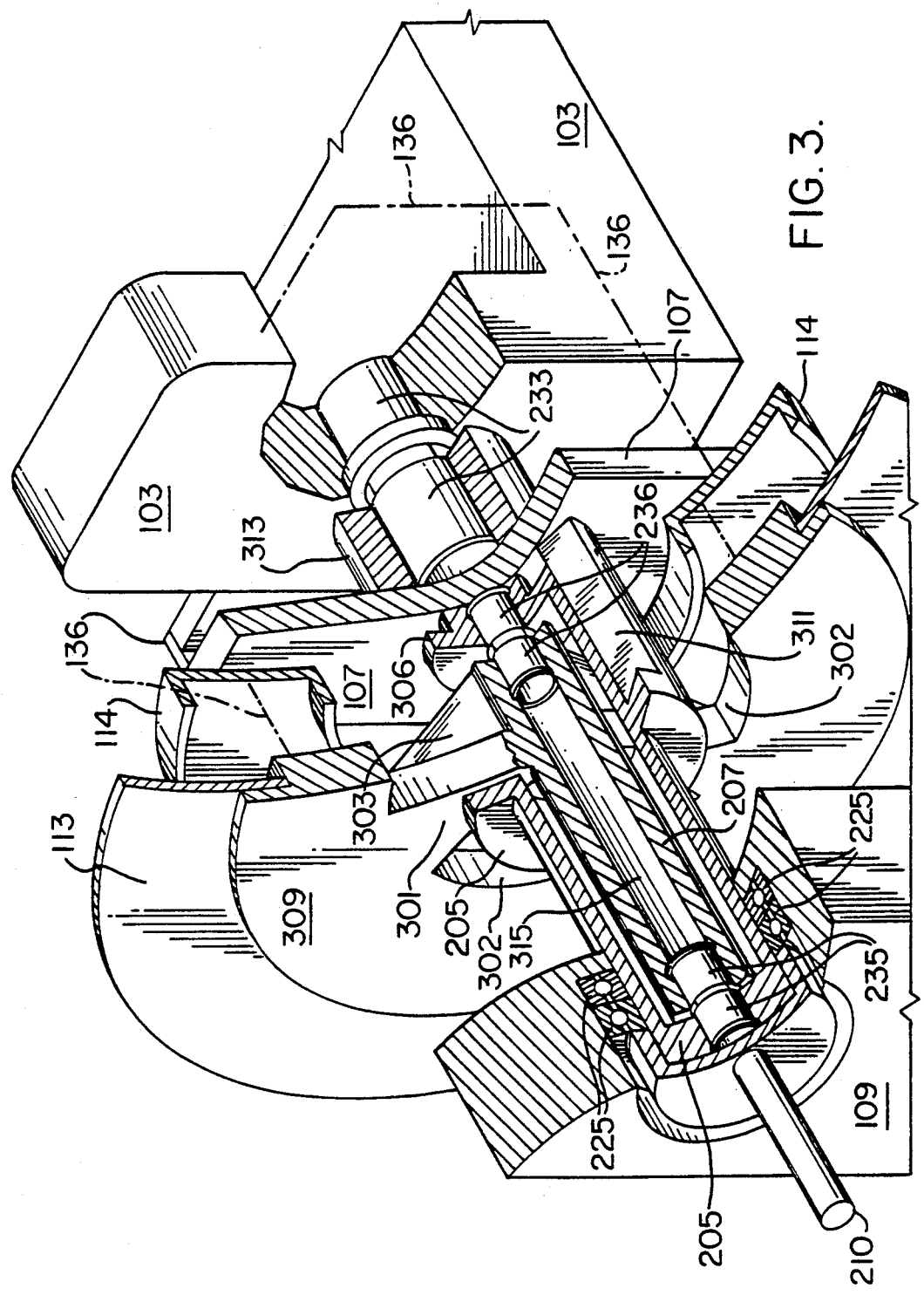
FIG. 3 is cut-away view illustrating the location of the flexible pivots used to attach the position encoder disc to the yoke.

In order to indicate the instantaneous position of mirror 101, position encoder disc 113 is located between the left end of yoke 107 and support 109, as shown in FIGS. 1, 2 and 3. Position encoder disc 113 rotates indirectly in accordance with the rotation of drive shaft 210, as well as with the rotation of mirror/mirror carrier assembly 101/103. Position encoding devices such as position encoder disc 113 are well-known in the art. A typical similar encoder disc is manufactured by Aerospace Controls Corp., Little Rock, Ark. Encoder read heads 115, 115' are attached to support 109 and are proximate position encoder disc 113. Encoder read heads 115, 115' read marks placed around the periphery of encoder disc 113 in order to generate information regarding mirror 101 rotational position with respect to support 109.

FIG. 3 is cut-away view illustrating the connection between position encoder disc 113, inner shaft 207, outer shaft 205, and yoke 107. As shown in FIG. 3, drive shaft 210 is connected to a first (left) end of outer shaft 205 which first end is connected to one (left) end of flexible pivot 235. The other (right) end of flexible pivot 235 is connected to a first (left) end of inner shaft 207 which rotates inside of hollow outer shaft 205. Outer shaft 205 is supported on its left end by bearing pair 225. The second (right) end of inner shaft 207 is connected to one (left) end of flexible pivot 236. The other (right) end of flexible pivot 236 is connected to collar 306 which is rigidly attached to prongs 311 of shaft 205 (and to yoke 107). Inner shaft 207 is thus torsionally and pivotally coupled to outer shaft 205 by flexible pivots 235 and 236. Note that there is a void 315 located inside of inner shaft 207.

Plate 309 and attached position encoder disc 113 are rigidly connected to inner shaft 207 rather than to outer shaft 205. Plate 309 comprises three struts 301 with three holes 302 therebetween. Outer shaft 205 is rigidly connected to yoke 107 by three prongs 311 which pass through holes 302. Prongs 311 comprise an integral part of outer shaft 205. Three fins 303 coupled to inner shaft 207 are used to add structural support to the connection between inner shaft 207 and plate 309. This connection is better shown in FIG. 4, described below.

Yoke 107 is attached to the left end of flexible pivot 233 via yoke attachment cylinder 313 which is rigidly connected to yoke 107. The right end of flexible pivot 233 is attached to mirror carrier 103.

Flexible pivots 235 and 236 attached to inner shaft 207 are substantially smaller than the flexible pivots 133 and 233 connected to mirror carrier 103. Flexible pivots 235 and 236 are used primarily to support inner shaft 207 independently of the mirror/mirror carrier 101/103 to reduce the eccentric motion of the mirror/mirror carrier 101/103 caused by using larger flexible pivots 133 and 233 during a scanning operation.

Figure 4:
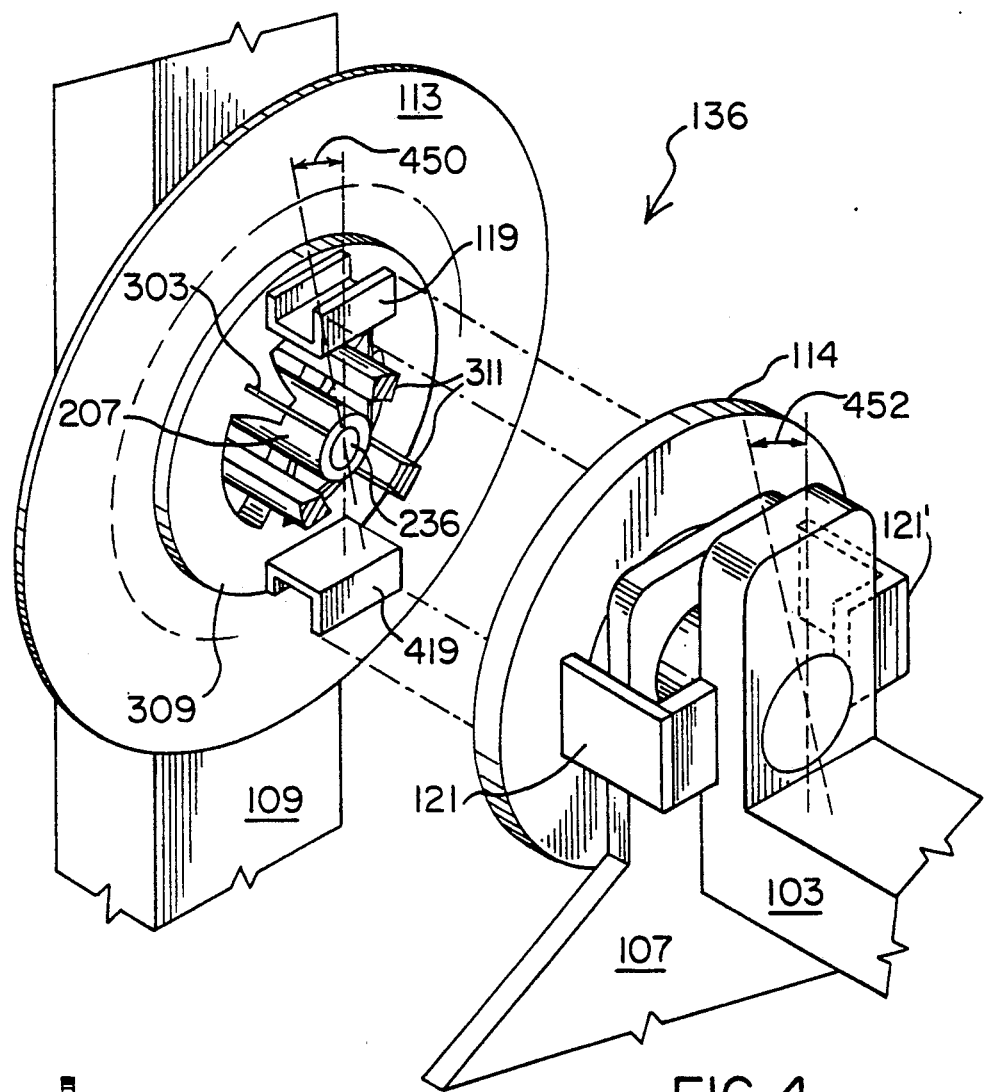
FIGS. 4 and 5 illustrate the inverted box flexure used to attach the position encoder disc to the mirror carrier.
Figure 5:
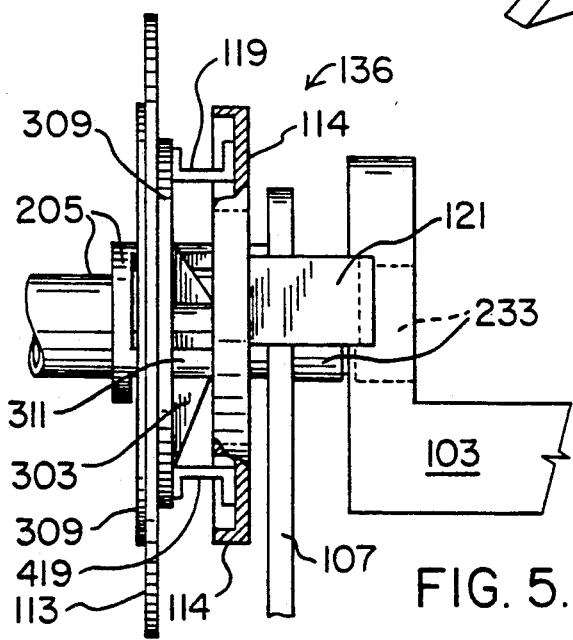

FIGS. 4 and 5 illustrate the inverted box flexure 136 used to attach position encoder disc 113 to mirror carrier 103. Inverted box flexure 136 comprises two coupling blade pairs 119, 419' and 121, 121' which are used to attach position encoder disc 113 to mirror carrier 103. Position encoder disc 113 is coupled via inverted box flexure 136 to mirror carrier 103 and rotates in accordance with mirror carrier 103 during a scanning operation. The use of an inverted box flexure 136 allows closer tracking of position encoder disc 113 with mirror rotational position while providing decoupling between position encoder disc 113 and the eccentric movement of mirror/mirror carrier 101/103.

As shown in FIGS. 4 and 5, each pair of coupling blades 119, 419' and 121, 121' allows a slight flexing of the inverted box flexure 136 in orthogonal directions 450 and 452, respectively. This orthogonal counter-coupling allows a slight compliance with the eccentric motion of the mirror/mirror carrier assembly, while reducing some of the "wobble" otherwise imparted to the position encoder disk 113. In addition, the use of small flexible pivots 235 and 235 allow position encoder disk 113 to more accurately track the angular position of mirror 101 imparted by inverted box flexure 136 to position encoder disc 113 during a scanning operation, despite the eccentric motion of the mirror 101. Both coarse and fine position determination of mirror 101 can thus be accurately made using the system of the present invention.

It is to be expressly understood that the claimed invention is not to be limited to the description of the exemplary embodiment but encompasses other modifications and alterations within the scope and spirit of the inventive concept.

RATIONLESS SCANNING AND POSITIONING SYSTEM
Reference No. List

| | | |
|---|---|---|
| Figures 1 & 2 | | |
| 100 | | Scanning System |
| 101 | | Mirror |
| 103 | | Mirror Carrier |
| 105 | | Reaction Mass |
| 107 | | Yoke |
| 109, 109' | | (Scanning System) Support |
| 111 | | Yoke Drive Motor |
| 112 | | Gear |
| 113 | | Position Encoder Disc |
| 114 | | Intermediate Plate |
| 115, 115' | | (Encoder) Read Heads |
| 116 | | Right Yoke support shaft |
| 117, 117' | | Drive Flexures |
| 118 | | Bushing |
| 119, 419 | | 1st coupling blade pair |
| 121, 121' | | 2nd coupling blade pair |
| 127 | | Actuator motor Coil |
| 128 | | Actuator motor Core |
| 133, 233 | | (Mirror Carrier) Flexible Pivots |
| 136 | | Inverted box flexure |
| 140, 140' | | (Linear) Actuators |
| 205 | | Outer shaft |
| 207 | | Inner shaft |
| 210 | | Drive Shaft |
| 220 | | Axis of rotation of yoke |
| 223 | | (Left Yoke Support) Bearing Pair |
| 225 | | (Right Yoke Support) Bearing Pair |
| 231, 231' | | (Reaction Mass) Flexible Pivots |
| 233, 133 | | (Mirror carrier) flexible Pivots |

RATIONLESS SCANNING AND POSITIONING SYSTEM
Reference No. List -continued

| | |
|---|---|
| 235, 236 | (Position Encoder Disc) Flexible Pivots |
| 240 | Axis of rotation of reaction mass |
| Figure 3 | |
| 301 | Strut |
| 302 | Hole (inter-strut) |
| 303 | Fin |
| 306 | Collar (prong/yoke) |
| 309 | (encoder disc) Plate |
| 311 | Prong(s) |
| 313 | Yoke attachment cylinder (Yoke 107 - flex. pivot 233) |
| 315 | Void (inside outer shaft 205) |
| Figure 4 | |
| 419, 119 | 1st coupling blade pair |
| 450 | flex direction (allowed by coupling blades 119, 419) |
| 452 | flex direction (allowed by coupling blades 121, 121') |
| Figures 8 & 9 | |
| 801, 801' | Flat springs |
| 803 | Plate |
| 805 | Plate |
| 807 | Plate |
| 809 | Plate |
| 900, 900' | Drive flexure direction |
| 901, 901' | Drive flexure direction |

I claim:

1. Pivotal platform apparatus comprising:

a yoke member;

a mirror carrier pivotally attached by first flexible pivot means to said yoke member and having a first rotational inertia about a first axis;

a reaction mass pivotally attached by a second flexible pivot means to said yoke member and having a second rotational inertia about a second axis;

drive flexure means for transmitting pivotal movement between said reaction mass and said mirror carrier;

motor means effective when energized for pivotally moving said reaction mass from a first reaction mass position to a second reaction mass position about said second axis;

said drive flexure means being responsive to said pivotal movement of said reaction mass to effect a pivotal movement of said mirror carrier about said first axis from a first mirror carrier position to a second mirror carrier position;

said first flexible pivot means and said second flexible pivot means being effective to move said mirror carrier pivotally from said second mirror carrier position to said first mirror carrier position and to move said reaction mass pivotally from said second reaction mass position to said first reaction mass position when said motor means is de-energized; and means for using said second rotational inertia of said reaction mass to react against said first rotational inertia of said mirror carrier so as to cause a reactionless effect of said apparatus comprising said mirror carrier and said reaction mass.

2. Pivotal platform apparatus as claimed in claim 1 in which said drive flexure means for transmitting pivotal movement comprises means for transmitting pivotal movement to said mirror carrier that is rotationally opposite to the pivotal movement of said reaction mass; and said means for using said second rotational inertia of said reaction mass to react against said first rotational inertia comprises said rotationally opposite pivotal movement.

3. Pivotal platform apparatus as claimed in claim 1 in which said means for transmitting pivotal movement between said mirror carrier and said reaction mass comprises a pair of flexure elements located at a first end and at a second end of structure comprising said reaction mass.

4. The pivotal platform apparatus as claimed in claim 1 in combination with:
a position encoder disk adapted to rotate about said first axis;
box flexure means interconnecting said mirror carrier with said position encoder disk so said pivotal movement of said mirror carrier effects a corresponding pivotal movement of said position encoder disk about said first axis;
said first flexible pivot means being responsive to said pivotal movement of said mirror carrier for imparting an eccentric pivotal movement to said mirror carrier; and
said box flexure means being effective for insulating said position encoder disk from said eccentric pivotal movement of said mirror carrier.

5. Pivotal platform apparatus as claimed in claim 1 in which said motor means for pivotally moving said reaction mass has a first part that is fixably attached to said yoke member and a second part that is attached to said reaction mass and is movable with respect to said first part.

6. Pivotal platform apparatus as claimed in claim 1 in which said motor means for pivotally moving said reaction mass comprises a motor having a pole piece and a motor coil that are attached to different ones of said mirror carrier and said reaction mass.

7. Pivotal platform apparatus as claimed in claim 1 in which:
said reaction mass is an elongated member having first and second ends defining a line parallel to said second axis;
said motor means for pivotally moving said reaction mass comprises at least two motors each having a pole piece that is attached to said reaction mass proximal to respective ones of ends thereof and each having a motor coil that is attached to said yoke member in working proximity to respective ones of said pole pieces; and
said second inertia of said reaction mass comprises said first and second pole pieces.

8. Pivotal platform apparatus as claimed in claim 1 in which:
said reaction mass is pivotally attached around said second axis that is parallel to, and spaced apart from, said first axis; and
said drive flexure means for transmitting pivotal movement between said reaction mass and said mirror carrier comprises means for transmitting reverse rotation movement between said reaction mass and said mirror carrier.

9. Pivotal platform apparatus as claimed in claim 1 in which:
said reaction mass is pivotally attached around said second axis that is parallel to, and spaced apart from, said first axis; and
said drive flexure means for transmitting pivotal movement between said reaction mass and said mirror carrier includes means, comprising a pair of flexure drive elements, for transmitting reverse rotation movement between said reaction mass and said mirror carrier.

10. Pivotal platform apparatus as claimed in claim 1 in which:
said reaction mass is pivotally attached around said second axis that is parallel to, and spaced apart from, said first axis; and
said drive flexure means for transmitting pivotal movement between said reaction mass and said mirror carrier includes means, comprising at least first and second taut elements, for transmitting reverse rotation movement between said reaction mass and said mirror carrier.

11. Pivotal platform apparatus as claimed in claim 1 in which:
said reaction mass is pivotally attached around said second pivot axis that is spaced apart and parallel to said first pivot axis;
said drive flexure means for transmitting pivotal movement between said mirror carrier and said reaction mass includes flat metal flexure elements for transmitting opposite rotation pivotal movement between said reaction mass and said mirror carrier;
said motor means for pivotally moving said reaction mass comprises a pair of magnetic pole pieces attached to said reaction mass in spaced apart locations, and a pair of motor coils attached to said yoke member in locations wherein said motor coils cooperate with respective ones of said magnetic pole pieces; and
said means for using said second rotational inertia to react against said first rotational inertia comprises said opposite rotation pivotal movement.

12. The pivotal platform apparatus as claimed in claim 11 in combination with:
a position encoder disk adapted to rotate about said first axis;
box flexure means interconnecting said mirror carrier with said position encoder disk so said pivotal movement of said mirror carrier effects a corresponding pivotal movement of said position encoder disk about said first axis;
said first flexible pivot means being responsive to said pivotal movement of said mirror carrier for imparting an eccentric pivotal movement to said mirror carrier; and
said box flexure means being effective for insulating said position encoder disk from said eccentric pivotal movement of said mirror carrier.

13. Pivotal platform apparatus comprising:
a yoke member;
a mirror carrier pivotally attached by first flexible pivot means to said yoke member and having a first rotational inertia about a first axis;
a reaction mass pivotally attached by a second flexible pivot means to said yoke member and having a second rotational inertia about a second axis;
drive flexure means for transmitting pivotal movement between said reaction mass and said mirror carrier;
motor means driveably connected to said yoke member for rotationally moving said mirror carrier; and
means for using said second rotational inertia to react against said first rotational inertia.

14. Pivotal platform apparatus as claimed in claim 13 in which said means for using said second rotational inertia to react against said first rotational inertia comprises means for rotationally moving said reaction mass in an opposite direction from said rotational movement of said mirror carrier.

15. Pivotal platform apparatus comprising:
a yoke member;
a position encoder disk;
a mirror carrier pivotally attached by first flexible pivot means to said yoke member and having a first rotational inertia about a first axis;
box flexure means for connecting said mirror carrier with said position encoder disk;
a reaction mass pivotally attached by a second flexible pivot means to said yoke member and having a second rotational inertia about a second axis;
drive flexure means for transmitting pivotal movement between said reaction mass and said mirror carrier;
motor means effective when energized for pivotally moving said reaction mass from a first reaction mass position to a second reaction mass position about said second axis;
said drive flexure means being responsive to said pivotal movement of said reaction mass to exert a pivotal movement of said mirror carrier from a first mirror carrier position to a second mirror carrier position about said first axis;
said box flexure means being responsive to said pivotal movement of said mirror carrier for rotating said position encoder disk about said first axis for generating information indicating the pivotal movement of said mirror carrier;
said first flexible pivot means and said second flexible pivot means being effective to move said mirror carrier pivotally from said second mirror carrier position to said first mirror carrier position and to move said reaction mass pivotally from said second reaction mass position to said first reaction mass position when said motor means is de-energized; and
means for using said second rotational inertia of said reaction mass to react against said first rotational inertia of said mirror carrier so as to cause a reactionless effect of said apparatus comprising said mirror carrier and said reaction mass.

16. Pivotal platform apparatus comprising
a yoke member;
a position encoder disk;
a mirror carrier pivotally attached by a first flexible pivot means to said yoke member and having a first rotational inertia about a first axis;
a reaction mass pivotally attached by a second flexible pivot means to said yoke member and having a second rotational inertia about a second axis;
means for transmitting pivotal movement to said reaction mass about said second axis;
means for transmitting pivotal movement to said mirror carrier about said first axis in response to a pivotal movement of said reaction mass;
said first flexible pivot means being responsive to said pivotal movement of said mirror carrier for imparting an eccentric pivotal movement to said mirror carrier about said first axis;
a box flexure means interconnecting said mirror carrier and said position encoder disk for responding to said pivotal movement of said mirror carrier to effect a corresponding pivotal movement of said position encoder disk;
said block flexure means being effective for insulating said position encoder disk from said eccentric pivotal movement of said mirror carrier caused by said first flexible pivot means; and
means for using said second rotational inertia of said reaction mass to react against said first rotational inertia of said mirror carrier.

17. The pivotal platform apparatus of claim 16 wherein said box flexure means comprises:
a first pair of flat spaced apart members defining separate parallel planes; and
a second pair of flat spaced apart members defining planes perpendicular to said planes of said first pair of spaced apart members.

18. The pivotal platform apparatus of claim 17 wherein said apparatus further comprises:
second motor means for pivotally moving said yoke member and said position encoder disk about said first axis;
a hollow outer shaft having prongs on one end thereof rigidly connecting said second motor means to said yoke member so that said yoke member is pivotally moved in response to the pivotal movement of said second motor means;
an inner shaft positioned coaxially with and inside said hollow outer shaft;
means for fixably connecting said position encoder disk to said inner shaft so that said inner shaft rotates in response to the pivotal movement imparted to said position encoder disk by said box flexure means;
said inner shaft having a first end connected to said yoke means by a first small flex pivot means;
said inner shaft having a second end connected to a support frame by a second small flex pivot means; and
openings in said means for fixably connecting said position encoder disk through which said prongs extend to connect said outer shaft to said yoke member.

19. A method for pivotally positioning a mirror carrier, said method comprising the steps of:
pivotally mounting said mirror carrier by first flexible pivot means to a yoke member; said mirror carrier having a first rotational inertia about a first axis;
pivotally mounting a reaction mass by a second flexible pivot means to said yoke member; said reaction mass having a second rotational inertia about a second axis;
operating a drive flexure means for transmitting pivotal movement between said reaction mass and said mirror carrier;
energizing motor means for pivotally moving said reaction mass from a first reaction mass position to a second reaction mass position about said second axis;
said drive flexure means being responsive to said pivotal movement of said reaction mass to effect a pivotal movement of said mirror carrier from a first mirror carrier position to a second mirror carrier position about said first axis;
said first flexible pivot means and said second flexible pivot means being effective to move said mirror carrier pivotally from said second mirror carrier position to said first mirror carrier position and to move said reaction mass pivotally from said second reaction mass position to said first reaction mass position when said motor means is de-energized; and using said second rotational inertia of said reaction mass to react against said first rotational inertia of said mirror carrier so as to cause a reactionless effect of an apparatus comprising said mirror carrier and said reaction mass.

20. The method of claim 19 in which said operating step comprises transmitting reverse rotation pivotal movement between said mirror carrier and said reaction mass.

21. The method of claim 19 in which said operating step comprises transmitting reverse rotation pivotal positioning between said reaction mass and said mirror carrier; and wherein said using step comprises said reverse rotation pivotal position.

22. The method of claim 19 in which said pivotally mounting step comprises:
   a) mounting one relatively positionable part of a motor on said reaction mass; and
   b) mounting another relatively positionable part of said motor on said yoke member.

23. The method of claim 19 in which said step of pivotally mounting said reaction mass comprises:
   a) mounting first and second magnetic pole pieces in spaced apart locations on said reaction mass; and
   b) attaching first and second coils to said yoke member in cooperating locations with said pole pieces.

* * * * *